(12) United States Patent
Angermayer

(10) Patent No.: US 10,908,774 B2
(45) Date of Patent: Feb. 2, 2021

(54) COPY-PASTE HISTORY ON A MOBILE DEVICE

(71) Applicant: SuccessFactors, Inc., South San Francisco, CA (US)

(72) Inventor: Thomas Angermayer, Stetten (DE)

(73) Assignee: SuccessFactors, Inc., South San Francisco, CA (US)

(*) Notice: Subject to any disclaimer, the term of this patent is extended or adjusted under 35 U.S.C. 154(b) by 1054 days.

(21) Appl. No.: 14/981,578

(22) Filed: Dec. 28, 2015

(65) Prior Publication Data

US 2017/0185241 A1 Jun. 29, 2017

(51) Int. Cl.
| | |
|---|---|
| *G06F 3/0482* | (2013.01) |
| *G06F 3/0484* | (2013.01) |
| *G06F 3/0488* | (2013.01) |
| *G06F 9/451* | (2018.01) |
| *G06F 9/54* | (2006.01) |
| *G06F 3/0481* | (2013.01) |

(52) U.S. Cl.
CPC .......... *G06F 3/0482* (2013.01); *G06F 3/0481* (2013.01); *G06F 3/0488* (2013.01); *G06F 3/04842* (2013.01); *G06F 3/04886* (2013.01); *G06F 9/451* (2018.02); *G06F 9/543* (2013.01)

(58) Field of Classification Search
CPC . G06F 3/0482; G06F 3/04842; G06F 3/04886
See application file for complete search history.

(56) References Cited

U.S. PATENT DOCUMENTS

| | | | | |
|---|---|---|---|---|
| 2004/0230907 | A1* | 11/2004 | Yang | G06F 17/24 715/255 |
| 2007/0061747 | A1* | 3/2007 | Hahn | G06F 9/543 715/764 |
| 2014/0025727 | A1* | 1/2014 | Ahn | H04L 67/1095 709/203 |
| 2014/0160049 | A1* | 6/2014 | Shin | G06F 3/0486 345/173 |
| 2015/0331720 | A1* | 11/2015 | Huetter | G06F 9/544 718/104 |

* cited by examiner

*Primary Examiner* — Seth A Silverman
(74) *Attorney, Agent, or Firm* — Schwegman Lundberg & Woessner, P.A.

(57) ABSTRACT

This disclosure provides a method, system, and computer-readable medium for maintaining a history of copied objects using a mobile device and providing a menu listing the history of copied objects when a preconfigured gesture is received by the mobile device. The history of copied objects includes text objects, such as words, phrases, sentences, or complete paragraphs, and non-text objects, such as images, sounds, movies, and other such non-text objects. In addition, the mobile device is configured to be context-sensitive such that the alphanumeric characters of the text objects are saved in a persistent data storage whereas references to the non-text objects are saved.

20 Claims, 13 Drawing Sheets

COPY-PASTE HISTORY ON A MOBILE DEVICE

TECHNICAL FIELD

The subject matter disclosed herein generally relates to a system, method, and computer-readable medium for providing a copy-paste history on a mobile device using an additional gesture. In particular, the copy-paste history is implemented using a context-sensitive copy and paste selection mechanism, whereby objects to be copied and pasted are stored either as references or as the objects themselves depending on whether the object is text or non-text.

BACKGROUND

When used in the context of word processing or data manipulation, the terms "copy" and "paste" generally refer to the act of copying a text or non-text object (e.g., the "copy" part), storing that object in memory, and then retrieving that object from memory to be placed or displayed at a designated location (e.g., the "paste" part). Mobile devices today are equipped to perform some simple word processing tasks and general data manipulation. However, today's mobile devices are typically limited in that the copy and paste functionalities are generally limited to a single object. Thus, a user of a mobile device is typically limited to copying a single object (e.g., a selection of words are words or selection of a non-text object) and then pasting that single object. Should the user desire to paste a previously copied object, the user must re-copy the previously copied object, which, in some instances, may be difficult for the user to find. Thus, the manner in which copy and paste is implemented in today's mobile devices can be frustrating and time-consuming to the user of the mobile device.

SUMMARY

In one embodiment, this disclosure provides a system that includes a machine-readable memory storing computer-executable instructions, and at least one hardware processor communicatively coupled to the machine-readable memory that, having executed the computer-executable instructions, is configured to display, on a display of a mobile device, a first plurality of options for inserting an object previously copied, each displayed option corresponding to a previously copied object, receive, from an input component of the mobile device, a selection of an option from the first plurality of options, and electronically insert the previously copied object corresponding to the received selection at a designated location displayed on the display of the mobile device.

In another embodiment of the system, the previously copied objects associated with the plurality of displayed options are each associated with the same object type, the object type being determined according to the designated location.

In a further embodiment of the system, at least one previously copied object comprises a non-text object and a reference to the non-text object, at least one displayed option was included in the first plurality of options by determining that the at least one previously copied object was accessible by the at least one hardware processor, and electronically inserting the previously copied object comprises retrieving the non-text object using the reference to the non-text object.

In yet another embodiment of the system, the at least one hardware processor is further configured to receive a selection of an object to copy, the object being displayed on the display of the mobile device, and in response to a determination that the selected object is a non-text object, create a reference to the non-text object in the machine-readable memory of the mobile device. In addition, at least one of the options of the first plurality of options is associated with the reference to the non-text object.

In yet a further embodiment of the system, the at least one hardware processor is further configured to receive a selection of an object to copy, the object being displayed on the display of the mobile device, and in response to a determination that copying the selected object exceeds a copied object threshold indicating a maximum number of previously copied objects, remove the earliest previously copied object from a plurality of previously copied objects. In addition, the at least one hardware processor is further configured to store the selected object as the newest copied object relative to the plurality of previously copied objects, the selected object being associated with the plurality of previously copied objects.

In another embodiment of the system, the first plurality of options comprise a first option corresponding to a first text object, a second option corresponding to a second text object, and a third option corresponding to a third text object, each of the first, second, and third text objects being different objects.

In a further embodiment of the system, the at least one hardware processor is further configured to receive a first gesture that causes the display of the mobile device to display a second plurality of options, the second plurality of options comprising an option to display the first plurality of options, and receive a second gesture that causes the display of the first plurality of options, wherein the first gesture and the second gesture are different gesture types.

This disclosure further describes a method that includes displaying, on a display of a mobile device, a first plurality of options for inserting an object previously copied, each displayed option corresponding to a previously copied object, receiving, from an input component of the mobile device, a selection of an option from the first plurality of options, and electronically inserting, by at least one hardware processor of the mobile device, the previously copied object corresponding to the received selection at a designated location displayed on the display of the mobile device.

In another embodiment of the method, the previously copied objects associated with the plurality of displayed options are each associated with the same object type, the object type being determined according to the designated location.

In a further embodiment of the method, at least one displayed option selected from the first plurality of options comprises a label associated with the previously copied object corresponding to the at least one displayed option.

In yet another embodiment of the method, at least one previously copied object comprises a non-text object and a reference to the non-text object, at least one displayed option was included in the first plurality of options by determining that the at least one previously copied object was accessible by the at least one hardware processor, and electronically inserting the previously copied object comprises retrieving the non-text object using the reference to the non-text object.

In yet a further embodiment of the method, the method includes receiving a selection of an object to copy, the object being displayed on the display of the mobile device, and in response to a determination that the selected object is a non-text object, creating a reference to the non-text object in a machine-readable memory of the mobile device, wherein at least one of the options of the first plurality of options is associated with the reference to the non-text object.

In another embodiment of the method, the method includes receiving a selection of an object to copy, the object being displayed on the display of the mobile device, and in response to a determination that copying the selected object exceeds a copied object threshold indicating a maximum number of previously copied objects, removing the earliest previously copied object from a plurality of previously copied objects. The method also includes storing the selected object as the newest copied object relative to the plurality of previously copied objects, the selected object being associated with the plurality of previously copied objects.

In a further embodiment of the method, the first plurality of options comprise a first option corresponding to a first text object, a second option corresponding to a second text object, and a third option corresponding to a third text object, each of the first, second, and third text objects being different objects.

In yet another embodiment of the method, the method includes receiving a first gesture that causes the display of the mobile device to display a second plurality of options, the second plurality of options comprising an option to display the first plurality of options, and receiving a second gesture that causes the display of the first plurality of options, wherein the first gesture and the second gesture are different gesture types.

This disclosure further provides for a machine-readable medium storing computer-executable instructions that, when executed by at least one hardware processor, causes the at least one hardware processor to perform a plurality of operations. In one embodiment, the plurality of operations include displaying, on a display of a mobile device, a first plurality of options for inserting an object previously copied, each displayed option corresponding to a previously copied object, receiving, from an input component of the mobile device, a selection of an option from the first plurality of options, and electronically inserting, by at least one hardware processor of the mobile device, the previously copied object corresponding to the received selection at a designated location displayed on the display of the mobile device.

In another embodiment of the machine-readable medium, the previously copied objects associated with the plurality of displayed options are each associated with the same object type, the object type being determined according to the designated location.

In a further embodiment of the machine-readable medium, at least one previously copied object comprises a non-text object and a reference to the non-text object, at least one displayed option was included in the first plurality of options by determining that the at least one previously copied object was accessible by the at least one hardware processor, and electronically inserting the previously copied object comprises retrieving the non-text object using the reference to the non-text object.

In yet another embodiment of the machine-readable medium, the first plurality of options comprise a first option corresponding to a first text object, a second option corresponding to a second text object, and a third option corresponding to a third text object, each of the first, second, and third text objects being different objects.

In yet a further embodiment of the machine-readable medium, the plurality of operations further include receiving a first gesture that causes the display of the mobile device to display a second plurality of options, the second plurality of options comprising an option to display the first plurality of options, and receiving a second gesture that causes the display of the first plurality of options, wherein the first gesture and the second gesture are different gesture types.

BRIEF DESCRIPTION OF THE DRAWINGS

Some embodiments are illustrated by way of example and not limitation in the figures of the accompanying drawings.

DETAILED DESCRIPTION

Example methods and systems are directed to maintaining a history of copied objects using a mobile device and providing a menu listing the history of copied objects when a preconfigured gesture is received by the mobile device. The history of copied objects include text objects, such as words, phrases, sentences, or complete paragraphs, and non-text objects, such as images, sounds, movies, and other such non-text objects. In addition, in one embodiment, the mobile device is configured to be context-sensitive such that the alphanumeric characters of the text objects are saved in a persistent data storage whereas references to the non-text objects are saved.

Furthermore, with this context-sensitive feature, the mobile device determines which of the saved objects (e.g., the alphanumeric characters and/or the references) are suitable for a target destination when the target destination is selected for a "paste" operation. Where a selected object to be "pasted" is a text object, the mobile device copies the saved alphanumeric characters corresponding to the selected object to the target destination from the persistent data storage. Where a selected object to be "pasted" is a non-text object, the mobile device references the saved reference to the object, and copies the object from the saved reference to the target destination. The mobile device further provides a history of the objects that a user may paste when the user selects the target destination and provides a series of inputs as one or more gestures that the mobile device interprets to be a "paste" command. The technical benefit provided by this disclosure is that a mobile device is enhanced to provide a contextual history of objects that may be pasted by the user, which reduces the amount of time a user would ordinarily spend in having to re-copy objects previously copied.

Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Figure 1:
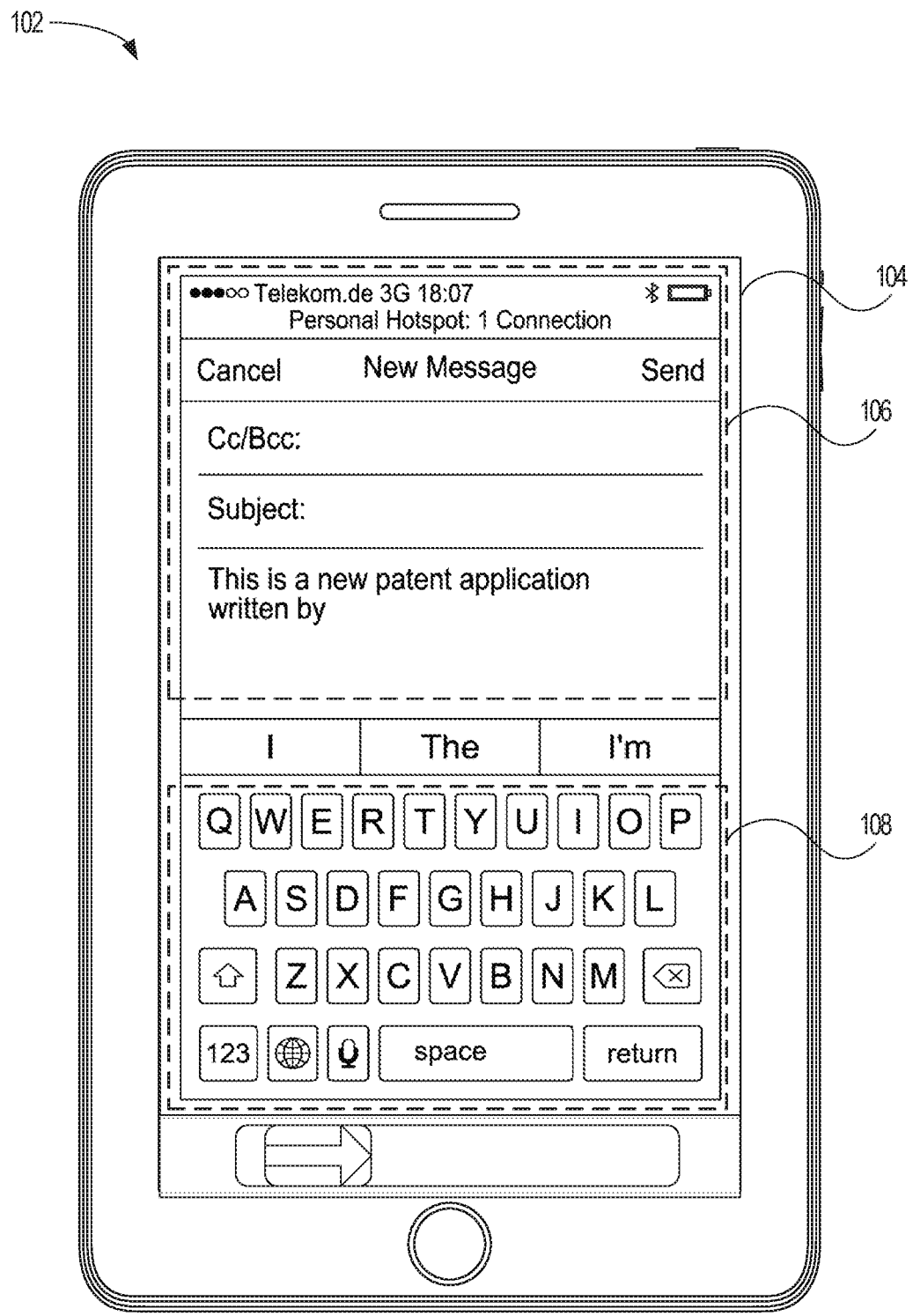
FIG. 1 is an illustration of a mobile device, in accordance with an example embodiment.

FIG. 1 is an illustration of a mobile device 102 in accordance with an example embodiment. In one embodiment, the mobile device 102 is a smart phone configured to execute an operating system and one or more mobile applications. Examples of such operating systems include, but are not limited to, iOS®, available from Apple, Inc., Android®, available from Google Inc., and Blackberry OS, available from Blackberry Ltd. Although shown as a smart phone in FIG. 1, the mobile device 102 may be a portable digital assistant (PDA), a cellular phone, a portable music player, a smartwatch, a handheld game console, a digital video camera, a head-mounted display, or any other mobile device.

In one embodiment, the mobile device 102 includes a display 104 configured to display output provided by the operating system and to receive input provided by a user. Accordingly, in this embodiment, the display 104 also acts as a user interface for interacting with the mobile device 102. To interact with the mobile device 102, a user may touch the display 104 with an input interface component, such as a finger, stylus, input pen, or other such input interface component. When the display 104 is touched, and as discussed below, the operating system interprets the touching as a request by the user to interact with the mobile device 102. In some circumstances, the touching by the user causes the operating system to display an electronically-generated keyboard 108 (e.g., a "soft" keyboard), which the user may interact with to provide one or more alphanumeric characters to the operating system. In addition, the display of the electronically-generated keyboard 108 causes the display 104 to create a section 106 where the output of the mobile device 102 is displayed. While the mobile device 102 is shown with the electronically-generated keyboard 108, the mobile device 102 may also include other input components, such as a hardware keyboard, microphone (e.g., for receiving one or more voice-activated commands), wirelessly-connected devices (e.g., a mouse and/or keyboard connected via Bluetooth®), and other such input components or combination of input components.

As used in this disclosure, touching the display 104 is interpreted as a "gesture" by the mobile device 102 (e.g., where a dedicated circuit is implemented to interpret gestures) and/or by the operating system. In this context, a "gesture" is any input to the mobile device 102 provided by touching the display 104. Gestures may take multiple forms including a predetermined period of time of touching the display 104, touching the display 104 and moving the input component in a specific (or general direction), touching the display 104 and moving the input component in a direction at a predetermined speed, and other such gestures.

As discussed below, physical movements of the input component when touching the display 104 are interpreted by a dedicated gesture circuit and/or the operating system, which then outputs or communicates the type of gesture provided. For example, a physical input of touching the display 104 for a period of time greater than a predetermined threshold (e.g., more than five seconds) at a single location is interpreted as a "long touch." As another example, a physical input of touching the display 104 by moving the input component from right to left is interpreted as a "left swipe." As discussed below, in one embodiment, the mobile device 102 includes a gesture framework that handles interpretations of physical inputs to the mobile device 102. This gesture framework provides applications being executed by the mobile device 102 with the gesture received via the display 104, such as the "long touch" or "left swipe" inputs.

The mobile device 102 may include one or more applications (also referred to as "apps") such as, but not limited to, a web browser, messaging application, electronic mail (email) application, a social networking access client, word processing application, and the like. Where the applications are executed locally by the mobile device 102, the applications are configured to provide one or more graphical user interfaces and functionalities for interacting with the mobile device 102. Where one or more applications are executed remotely, the mobile device 102 may include an access client, such as a web browser or other remote access client, to instantiate the remotely executed application.

Figure 2:
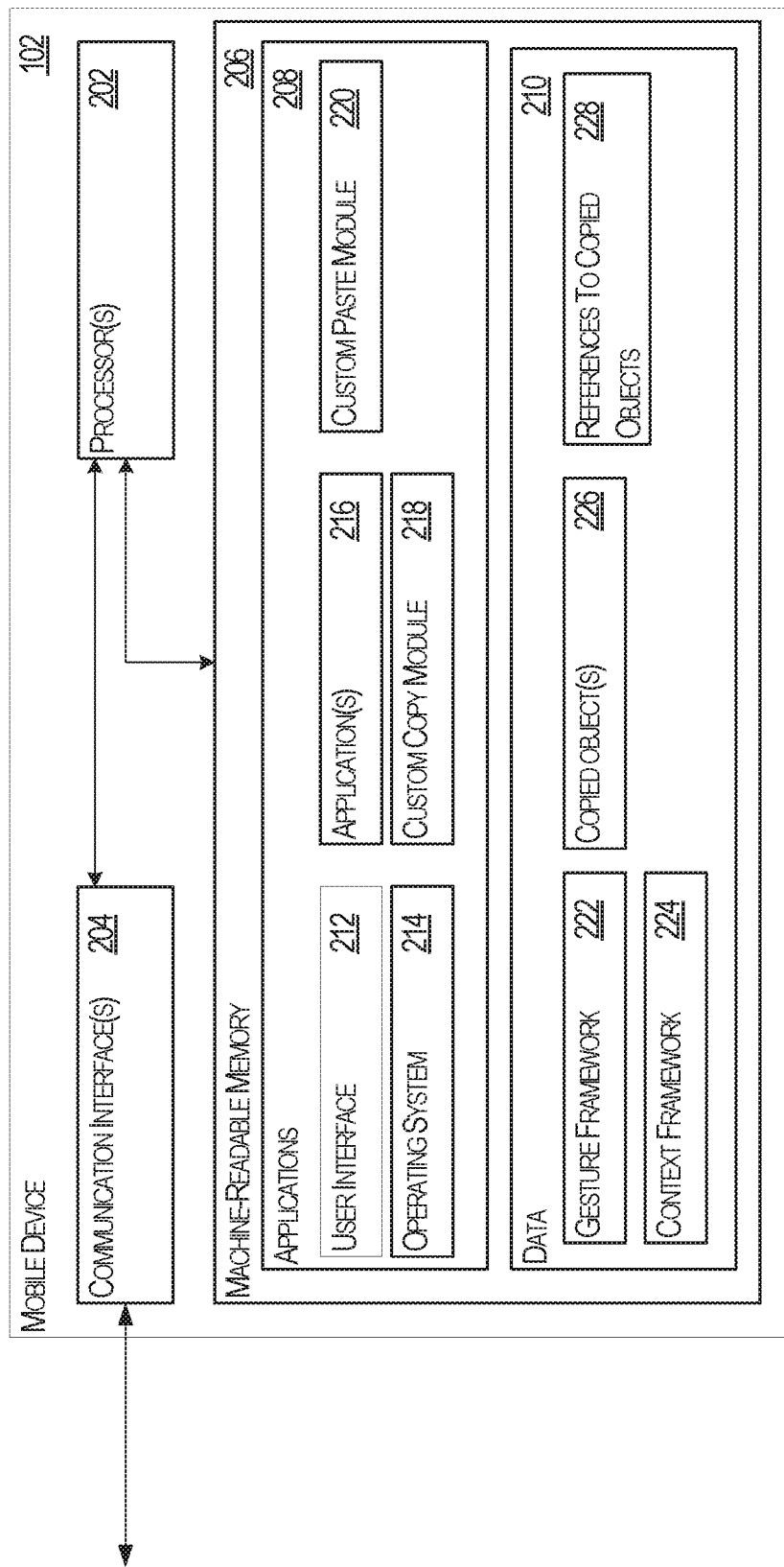
FIG. 2 is a block diagram illustrating the mobile device shown in FIG. 1, in accordance with an example embodiment.

FIG. 2 is a block diagram illustrating the mobile device 102 shown in FIG. 1, in accordance with an example embodiment. In one embodiment, the mobile device 102 includes one or more processor(s) 202, one or more communication interface(s) 204, and a machine-readable memory 206 that stores computer-executable instructions for one or more application(s) 208 and data 210 used to support one or more functionalities of the application(s) 208.

The various functional components of the mobile device 102 may reside on a single device or may be distributed across several computers in various arrangements. The various components of the mobile device 102 may, furthermore, access one or more databases and/or external systems, and each of the various components of the mobile device 102 may be in communication with one another. Further, while the components of FIG. 2 are discussed in the singular sense, it will be appreciated that in other embodiments multiple instances of the components may be employed.

The one or more processors 202 may be any type of commercially available processor, such as processors available from the Intel Corporation, Advanced Micro Devices, Texas Instruments, or other such processors. Further still, the one or more processors 202 may include one or more special-purpose processors, such as a Field-Programmable Gate Array (FPGA) or an Application Specific Integrated Circuit (ASIC). The one or more processors 202 may also include programmable logic or circuitry that is temporarily configured by software to perform certain operations. Thus, once configured by such software, the one or more processors 202 become specific machines (or specific components of a machine) uniquely tailored to perform the configured functions and are no longer general-purpose processors.

The one or more communication interfaces 204 are configured to facilitate communications between the mobile device 102 and other devices and/or systems (not shown). The one or more communication interfaces 204 may include one or more wired interfaces (e.g., an Ethernet interface, Universal Serial Bus ("USB") interface, a Thunderbolt® interface, etc.), one or more wireless interfaces (e.g., an IEEE 802.11b/g/n interface, a Bluetooth® interface, an IEEE 802.16 interface, etc.), or combination of such wired and wireless interfaces.

The machine-readable memory 206 includes various applications 208 and data 210 for implementing the copy-and-paste history disclosed herein. The machine-readable memory 206 includes one or more devices configured to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable memory" should be taken to include a single medium or multiple media (e.g., a centralized or distributed database, or associated caches and servers) able to store the applications 208 and the data 210. Accordingly, the machine-readable memory 206 may be implemented as a single storage apparatus or device, or, alternatively and/or additionally, as a "cloud-based" storage system or storage network that includes multiple storage apparatus or devices. As shown in FIG. 2, the machine-readable memory 206 excludes signals per se.

In one embodiment, the applications 208 are written in a computer-programming and/or scripting language. Examples of such languages include, but are not limited to C, C++, C #, Objective-C, Java, JavaScript, Perl, Python, or any other computer programming and/or scripting language now known or later developed.

With reference to FIG. 2, the applications 208 of the mobile device 102 include, but are not limited to, a user interface application 212, an operating system 214, application(s) 216, a custom copy module 218, and a custom paste module 220. The data 210 supporting these applications 208 include, but is not limited to, a gesture framework 222, a context framework 224, selected copied objects 226, and references to copied objects 228.

The user interface application 212 provides various graphical interfaces to the mobile device 102, which are displayed via the display 104. The graphical user interfaces accept input from a user and display output accordingly. The user interface application 212 further facilitates interactions between the user and one or more of the applications 208, such as the operating system 214, application(s) 216, the custom copy module 218, and the custom paste module 220. In one embodiment, the user interface application 212 is integrated into the operating system 214 to provide a consistent user experience for the application(s) 216.

The operating system 214 is system software that manages the hardware and software resources of the mobile device 102, and provides common services for the applications 208. The operating system 214 further includes time-sharing features so as to schedule tasks for efficient use of the resources available to the mobile device 102 such as processor time or cycles, read and/or write accesses to the machine-readable memory 206, input and/or output to the display 104, communications received and/or transmitted via the communication interface(s) 204, and other such resources. In addition, the operating system 214 acts as an intermediary between the applications 208 and the hardware functions available to the applications 208, such as receiving input from the display 104, providing output to the display 104, generating a sound through one or more speakers (not shown), reading from and/or writing to the machine-readable memory 206, and other such operations or combinations of operations. Examples of operating systems found on mobile devices include, but are not limited to, iOS, Android, Blackberry OS, and Windows Phone, which is available from the Microsoft Corporation.

The application(s) 216 include applications that are executed by the mobile device 102 and managed by the operating system 214. Examples of application(s) 216 include, but are not limited to, word processing applications, web browsing applications, software-based calculators, note-taking applications, calendaring applications, phone dialing applications, contact management applications, and other such applications. The application(s) 216 are in communication with the custom copy module 218 and the custom paste module 220 to provide the copy and paste functionalities for these modules 218, 220. In this manner, when the copy command is invoked or requested by the user of the mobile device 102, the user may select an object to copy from one or more of the application(s) 216. Similarly, when the paste command is invoked or requested by the user of the mobile device 102, the user may select which of the application(s) 216 in which to paste the copied object.

The custom copy module 218 is configured to provide a custom copy operation that, in one embodiment, is contextually aware and stores copied object(s) 226, or references to copied objects 228, in a persistent datastore such that the custom paste module 220 provides a history of such objects. Objects that are copied are stored within a designated portion of the data 210 (e.g., as copied object(s) 226) and use a comparable amount of the data 210 as the original object that was copied. In contrast, objects that are copied as references may reside in a different portion of the machine-readable memory 206 than the reference to the copied object. This is illustrated in FIG. 2 by designating a portion of the data 210 as a reference to copied objects 228. Where a reference to a copied object 228 is created within the section 228, there is a risk that the original object may be deleted by the user, by an application 216, or by the operating system 214. Accordingly, in alternative embodiments, the custom copy module 218 copies a selected object, or provides an option to copy the selected object, and stores the copy of the selected object in the copied object(s) 226. In this alternative embodiment, a member restriction threshold may be established by the custom copy module 218 (or the operating system 214) such that the user does not inadvertently use too much of the data 210 copying various objects.

In one embodiment, the custom copy module 218 is incorporated into the operating system 214. In this embodiment, the copied object(s) 226 and the references to copied objects 228 are stored in a persistent datastore such that the copied object(s) 226 and the references to copied objects 228 are not deleted when a given application terminates or is stopped by the user or the operating system 214. This embodiment has the benefit that the history of the copied object(s) 226 and the history of references to copied objects 228 are made available to one or more of the applications 216 that the user or operating system 214 may execute.

In an alternative embodiment, the custom copy module 218 is executed as a distinct application, and establishes a datastore in the data 210 for storing copied object(s) 226 and the references to copied objects 228. In this embodiment, the custom copy module 218 handles the memory management of the copied objects) 226 and the references of the copied objects 228.

As used in reference to the custom copy module 218, the term "object" generally refers to any content displayable, playable, or accessible by the operating system 214 of the mobile device 102. As examples, and without limitation, objects may include one or more alphanumeric characters (e.g., a letter, a word, a phrase, a paragraph, etc.), a displayed graphic or image, a displayed movie, or a file residing locally on the mobile device 102 or accessible by an application 216 or the operating system 214 and accessible via one or more networks (e.g., any combination of wired or wireless networks) or one or more communication interfaces (e.g., such as where the file resides on a machine-readable memory external to the mobile device 102). Examples of files that may be considered objects by the custom copy module 218 include, but are not limited to, image and/or graphic files, audiovisual files, sound files, data files, or any other such file accessible by the operating system 214. For the ease of readability, objects that are text (e.g., words, phrases, single or multiple letters, etc.) are referred herein as "text objects" whereas objects that are not purely text (e.g., data files, multimedia files, displayed images and/or graphics, etc.) are referred herein as "non-text objects".

In one embodiment, the user selects an object via an input to the display 104. In this context, the input may be a gesture or other touching of the display 104 to signal to the operating system 214 and/or the custom copy module 218 that a selected object is to be copied. In particular, the gesture or other touching may be interpreted by the gesture framework 222, which provides an identifier or other signal to the custom copy module 218 of the type of touching or gesture received. The type of input that signals to the custom copy module 218 that a selected object is to be copied may include a series of touch-based inputs, starting with a touching of a displayed object that exceeds a predetermined time threshold (e.g., being interpreted by the gesture framework 222 as a "long press" or "long touch"). Thereafter, a series of prompts or other icons and/or graphics may be displayed to the user via the display 104 for the user to indicate whether the selected object is to be copied.

In addition, the gesture that the custom copy module 218 interprets as a copy command may be configurable by the user via the operating system 214 or other interactions with the mobile device 102. In one embodiment, the gesture that invokes the custom copy module 218 is a default gesture predetermined or preprogrammed within the operating system 214. For example, a "long press" or "long touch" may invoke a menu or other display which provides the copy operation via the custom copy module 218. In another embodiment, the gesture is one or more movement of an input component across the display 104. For example, the custom copy module 218 may be preprogrammed or pre-configured with one or more gestures, which are selectable by the user via one or more user interfaces provided by the user interface application 212. Thus, the user may select which gesture invokes the copy operation, such as a "swipe left," "swipe right," "swipe up," or other such gesture or combination of gestures. As discussed above, the interpretation of the physical movements of the input components is provided by the gesture framework 222, which communicates an identifier or series of identifiers to the operating system 214 and/or the custom copy module 218 that identifies the received gesture.

In addition to the configurability of the gestures, the use of the copied object history may also be configurable. In one embodiment, the user may be presented with an option as to whether the selected object is to be copied and made available as a history of the copied objects. For example, the user may be presented with a graphic and/or icon that indicates a "historical copy" (e.g., an object that is to be made available via the custom paste module 220). In another embodiment, the copying of a selected object is via the custom copy module 218, which may supersede or override any default copy operation previously defined by the operating system 214. In yet a further embodiment, the custom copy module 218 may be configurable as to whether it is active or inactive (e.g., via a configuration option presented to the user via the display 104). In this embodiment, when active, the custom copy module 218 copies the selected object to these copied objects 226 or a reference to the object in the references to copied objects 228. When inactive, a default copy operation performable by the operating system 214 is invoked rather than the custom copy module 218. Other combinations or other implementations are also contemplated as falling within the scope of this disclosure.

In providing a history of copied objects, the custom copy module 218 may implement the history as first-in first-out (FIFO) with a threshold (e.g., a copied object threshold) to limit the number of objects that are copied. In this manner, objects that are copied first are removed first when a new object is copied and the copied object threshold is met or exceeded. In one embodiment, the copied object threshold may be configurable by the user such that the user may designate the number of copied objects to maintain in the history. In another embodiment, the copied object threshold is fixed such that the number of copied objects is predetermined. In yet a further embodiment, the copied object threshold is dynamic such that the number of copied objects changes according to the amount of memory used by the copied objects 226 and the amount of memory available to the operating system 214. In this embodiment, the copied object threshold may be set as a percentage (e.g., 50%, 75%, 40%, etc.) of memory that the custom copy module 218 is to use in copying objects.

In one embodiment, the custom copy module 218 implements an array to maintain a history of copied objects, where the number of elements in the array is equal to (or less than) the copied object threshold. In this embodiment, an element of the array includes at least two values: (1) an object label value that includes one or more alphanumeric characters that identify the contents of the array; and (2) a pointer to a memory address where the copied object is located or a value indicating where the copied object may be found. As discussed below, the custom paste module 220 references the object label value in displaying the history of copied objects to provide a human-readable label of the objects available to paste. Accordingly, in this embodiment, referencing a given element in the array yields the object that was copied or the reference to the object that was copied. However, an array is but one example of how the custom copy module 218 may implement the history of copied objects. Other implementations of maintaining a history of the copied objects 226 and the references to copied objects 228 include, but are not limited to, one or more databases, one or more database tables, pointers in memory, and other such implementations.

Furthermore, in addition to supporting a history of copied objects, the custom copy module 218 is context-sensitive. In this regard, the type of object selected by the user signals to the custom copy module 218 whether the object is to be substantively copied (e.g., whether to allocate memory corresponding to the size of the original object) or if a reference to the object is to be created. In this embodiment, the custom copy module 218 leverages a context framework 224 provided by the operating system 214 that indicates the type of selected object. Thus, interactions with an object by the user of the mobile device 102 cause the operating system 214 to invoke one or more methods and/or functions of the context framework 224, which then provide the object type to the custom copy module 218. As known to one of ordinary skill in the art, operating systems that provide such a context framework 224 include iOS, Android, Windows Phone, BlackBerry OS, and other such mobile device operating systems.

In one embodiment, the custom copy module 218 is preconfigured with the manner in which text objects and non-text objects are copied. In particular, text objects may be stored as the copied objects 226 whereas non-text objects may be stored as references (e.g., references to copied objects 228) to such objects. In this embodiment, a persistent datastore is used to store the copied objects 226 and references to copied objects 228. Furthermore, and in an alternative embodiment, the custom copy module 218 is configurable such that the user may designate the manner in which text objects and non-text objects are treated. In particular, using one or more graphical user interface displayed by the user interface application 212, the user may designate whether non-text objects are to be stored as copies of such objects or as references to such objects. In this alternative embodiment, the configurability of the custom copy module 218 allows the user to retain copies of non-text objects in the event that such non-text objects are deleted or no longer accessible.

In some instances, a non-text object may be stored remotely from the mobile device 102. For example, the non-text object may reside on a server accessible to the mobile device 102, such as a website server or FTP server. Accordingly, and in one embodiment, the custom copy module 218 is configured to detect whether the non-text object is stored locally (e.g., on a machine-readable memory internal to the mobile device 102) or remotely (e.g., a machine-readable memory communicatively coupled to the mobile device 102 via the communication interface(s) 204 or on a server in communication with the mobile device 102). Where the mobile device 102 determines that the non-text object is stored remotely, the custom copy module 218 may display a prompt on the display 104 as to whether the user desires to store a copy of the non-text object as a reference to the non-text object or as a copy of the non-text object itself. In an alternative embodiment, the custom copy module 218 is preconfigured to store a copy of the non-text object one stored remotely. In this manner, the custom copy module 218 is technically flexible to handle locally stored non-text objects and remotely stored non-text objects.

The custom paste module 220 is configured to display a history of copied objects (e.g., the copied object(s) 226 and the references to copied objects 228) and to insert an object selected from the displayed history into a location designated by the user. In one embodiment, the custom paste module 220 is activated in response to one or more gestures provided by e user via the display 104. In one embodiment, and like the custom copy module 218, the custom paste module 220 receives identifiers and/or signals from the gesture framework 222 indicating the type of gesture received in response to a touching by the user of the display 104.

As one example, when the user provides a first input, such as a "long press" (e.g., as interpreted by the gesture framework 222), the display 104 may display an option, in the form of a graphic and/or icon, for displaying a history of objects to paste a location designated by the first input. When a second input is received, such as a "tap" (e.g., the touching of the display 104 that is less than a predetermined time threshold), indicating that the option was selected, the custom paste module 220 displays labels indicating one or more objects that the user may paste at the location designated by the first input. When a label is selected from the displayed history, the custom paste module 220 retrieves the object corresponding to the selected label and inserts the selected object at a location designated by the user.

In one embodiment, the labels displayed by the custom paste module 220 are those labels that the custom copy module 218 associated with the copied object(s) 226 and the references to copied objects 228. A displayed label may indicate the object associated with the label. For example, the displayed label may include one or more words or phrases from the object where the object is a text object. As another example, the displayed label may be a filename or a portion of a Uniform Resource Location (URL) where the object is a non-text object. In alternative embodiments, the labels may be configurable such that the user may indicate the number of characters and/or words to include in a given label. In this manner, the displayed history indicates the objects that have been copied (or the references to the objects) via the custom copy module 218.

In some instances, a non-text object may have been deleted prior to the user pasting the object. In this regard, and in one embodiment, the custom paste module 220 is configured to determine whether the object associated with the reference to the object is still accessible by the mobile device 102 or the operating system 214. This determination may be performed at one or more times prior to the paste operation of the non-text object, such as when the history of paste bull objects is requested or displayed or one non-text object is selected from the displayed history. In performing this determination, the custom paste module 220 may attempt to access the non-text object identified by the reference associated with a non-text object. The custom paste module 220 may perform this determination for one or more of the non-text objects displayable within the displayed history of pasted objects.

The custom paste module 220 is further configured to provide an indication of whether the non-text object is still accessible. For example, the custom paste module 220 may apply different colors to the labels within the displayed history to indicate the availability of the paste will objects. In one embodiment, the custom paste module 220 applies a white color to the labels associated with objects that are still available for pasting (e.g., inserting at a location designated by the user) and a red color to the labels associated with objects that are not available for pasting. In an alternative embodiment, the custom paste module 220 is configured to delete the entry corresponding to a non-text object that is no longer available. In this embodiment, the custom paste module 220 prevents the display of labels associated with objects that are not available.

While the foregoing discussion focuses on the availability or unavailability of non-text objects, one of ordinary skill in the art will appreciate that such discussion can be extended to the text objects as well. In this regard, one or more of the foregoing embodiments may be implemented as a combination or modified to encompass the text objects as well. Thus, such alternative arrangements and implementations are contemplated as falling within the scope of this disclosure.

Further still, the custom paste module 220 is also configured to leverage the context framework 224 in determining which labels to display in the displayed history of objects that can be pasted. In this regard, when a user designates a location to paste an object, the context framework 224 provides an indication of the types of objects that are insertable at the user-designated location. In one embodiment, the context framework 224 via the operating system 214 provides the types of objects that are insertable. In an alternative embodiment, the custom paste module 220 invokes the context framework 224 to identify the types of objects that are insertable at the user-designated location. Further still, the context framework 224 may identify whether the user-designated location is suitable for text.

In response to the identified object types, the custom paste module 220 displays labels of objects having types corresponding to the identified object types from the context framework 224. In this manner, the history of objects that can be pasted displays those objects which are suitable for insertion at the user-designated location. For example, if the user-designated location is suitable only for text (e.g., the user-designated location is within a text-only word processing application), the history of objects that can be pasted would not include labels for non-text objects. Similarly, if the user-designated location is suitable only for non-text objects, the history of objects that can be pasted would not include labels for text objects. The benefit provided by this feature is that it ensures that the objects being pasted by the user are commensurate with the location where the object is being pasted. This ensures that non-text objects are not being pasted at text-only locations and that text objects are not being pasted at non-text-only locations.

In an alternative embodiment, the custom paste module 220 displays a history of objects that can be pasted regardless of the types of objects that are suitable for the user-designated location. In this further alternative embodiment, the custom paste module 220 may allow the user to select any label from the displayed history of objects that can be pasted, but may display an error or other prompt should the user attempt to paste an object at a location not suitable for the given object.

An illustrative example of the foregoing operations may be helpful in understanding this disclosure. FIGS. 3-8 illustrate operation of the mobile device from FIG. 1, in accordance with an example embodiment. The example illustrated by FIGS. 3-8 is with reference to the paste operation. In the context shown in FIGS. 3-8, the objects that have been copied are text objects, which may have been copied from various applications 216 of the mobile device 102.

Figure 3:
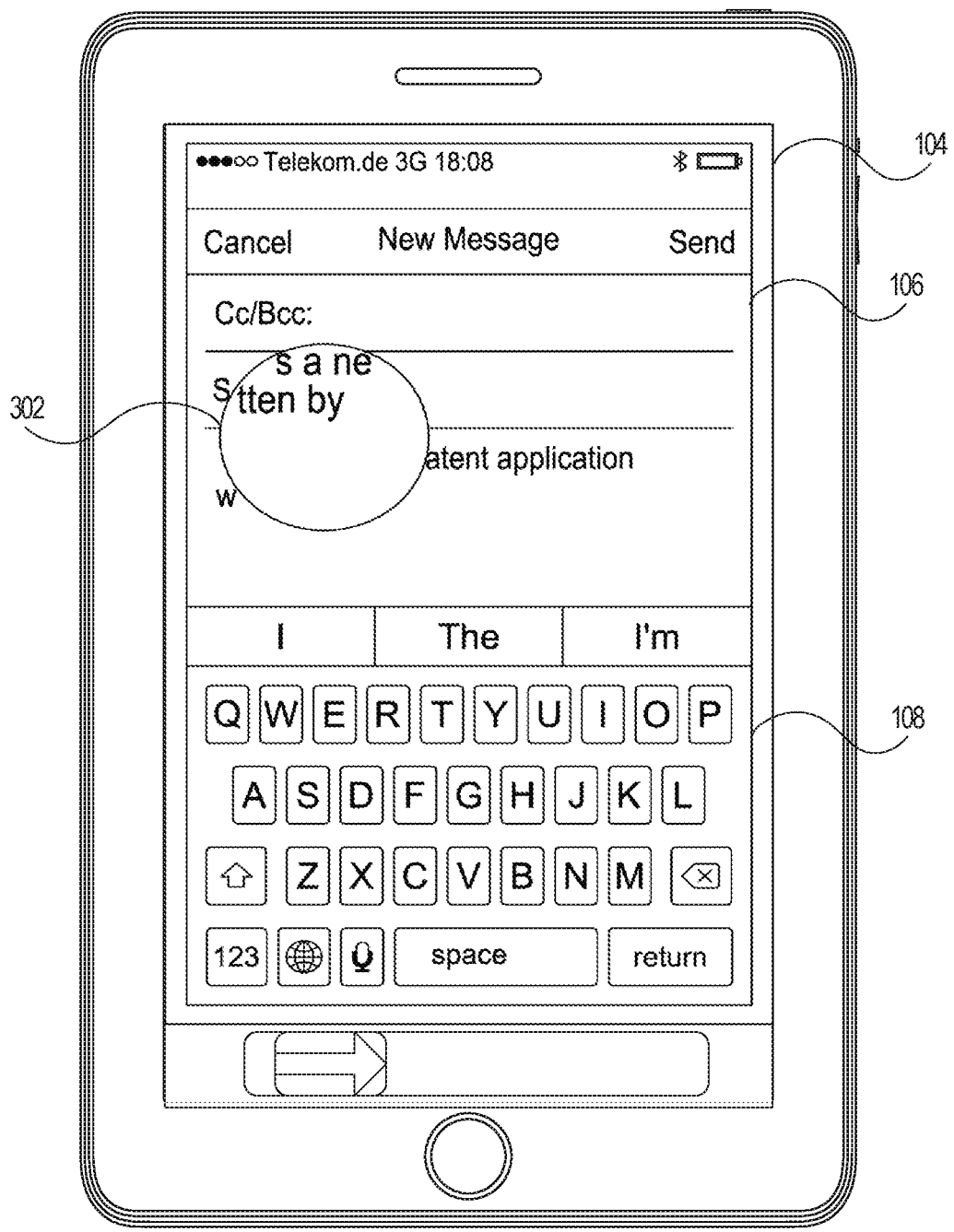
FIGS. 3-8 illustrate operation of the mobile device from FIG. 1, in accordance with an example embodiment.

FIG. 3 illustrates an example of the user selecting a location to paste a text object in accordance with an example embodiment. As shown in FIG. 3, an icon and/or graphic 302 identifies the location where the user intends to paste an object. In the embodiment shown in FIG. 3, the graphic 302 is a magnified version of the text displayed in the section 106 of the display 104. Further still, the graphic 302 is displayed so long as the operating system 214 and/or the gesture framework 222 determines that the user is touching the display 104.

Figure 4:
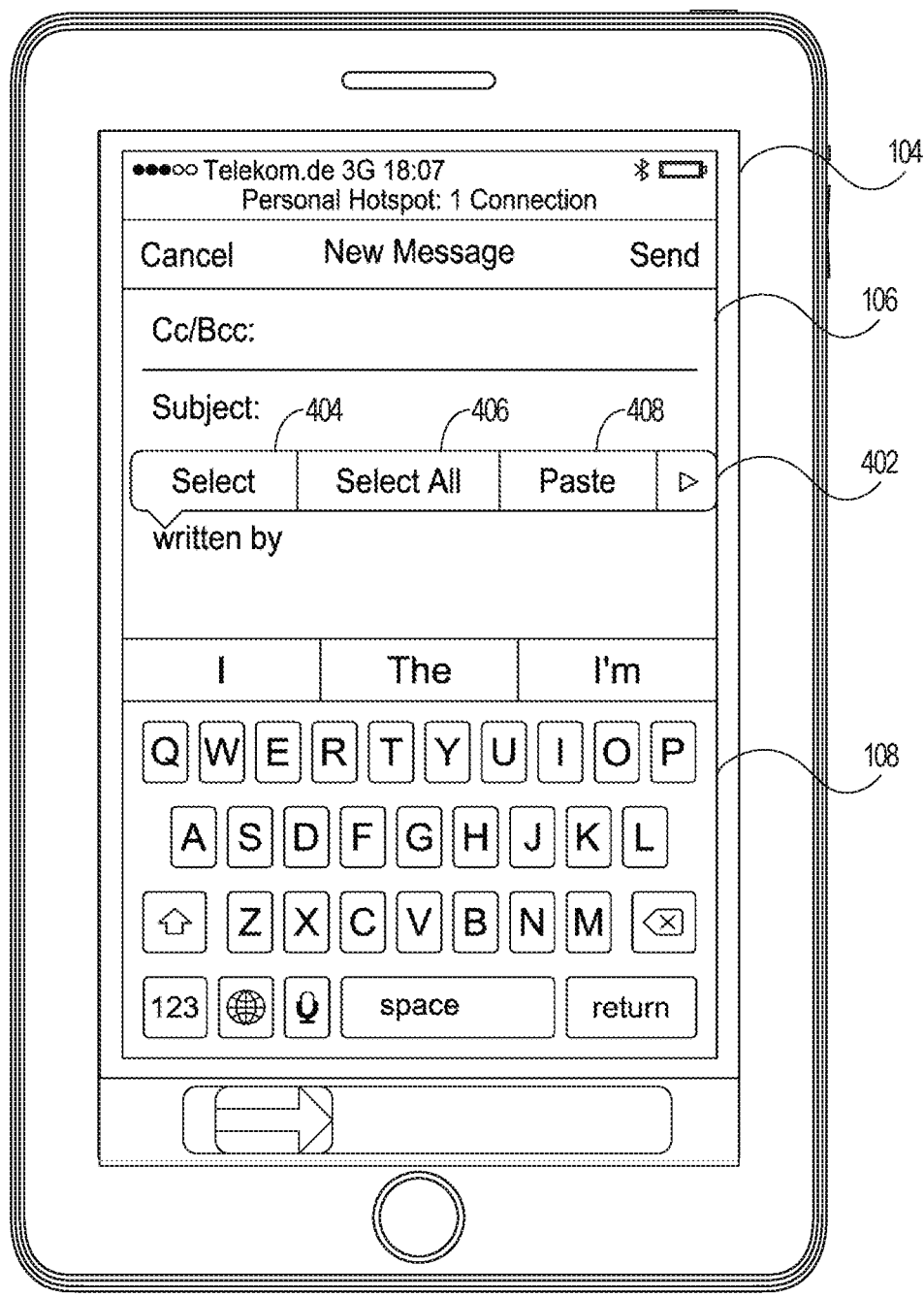

FIG. 4 illustrates an example of a menu 402 being displayed by the custom paste module 220 in response to a gesture interpreted by the gesture framework 222. In FIG. 4, the menu 402 includes one or more menu options 404-408, with one of the options 408 being the paste operation implemented by the custom paste module 220. In one embodiment, the display of the menu 402 is handled by the operating system 214 in conjunction with the user interface application 212. In this regard, the operating system 214 instructs the user interface application 212 to display the menu 402 in response to the received gesture, which the gesture framework 222 may interpreted as a "long press" or a "long touch."

Figure 5:
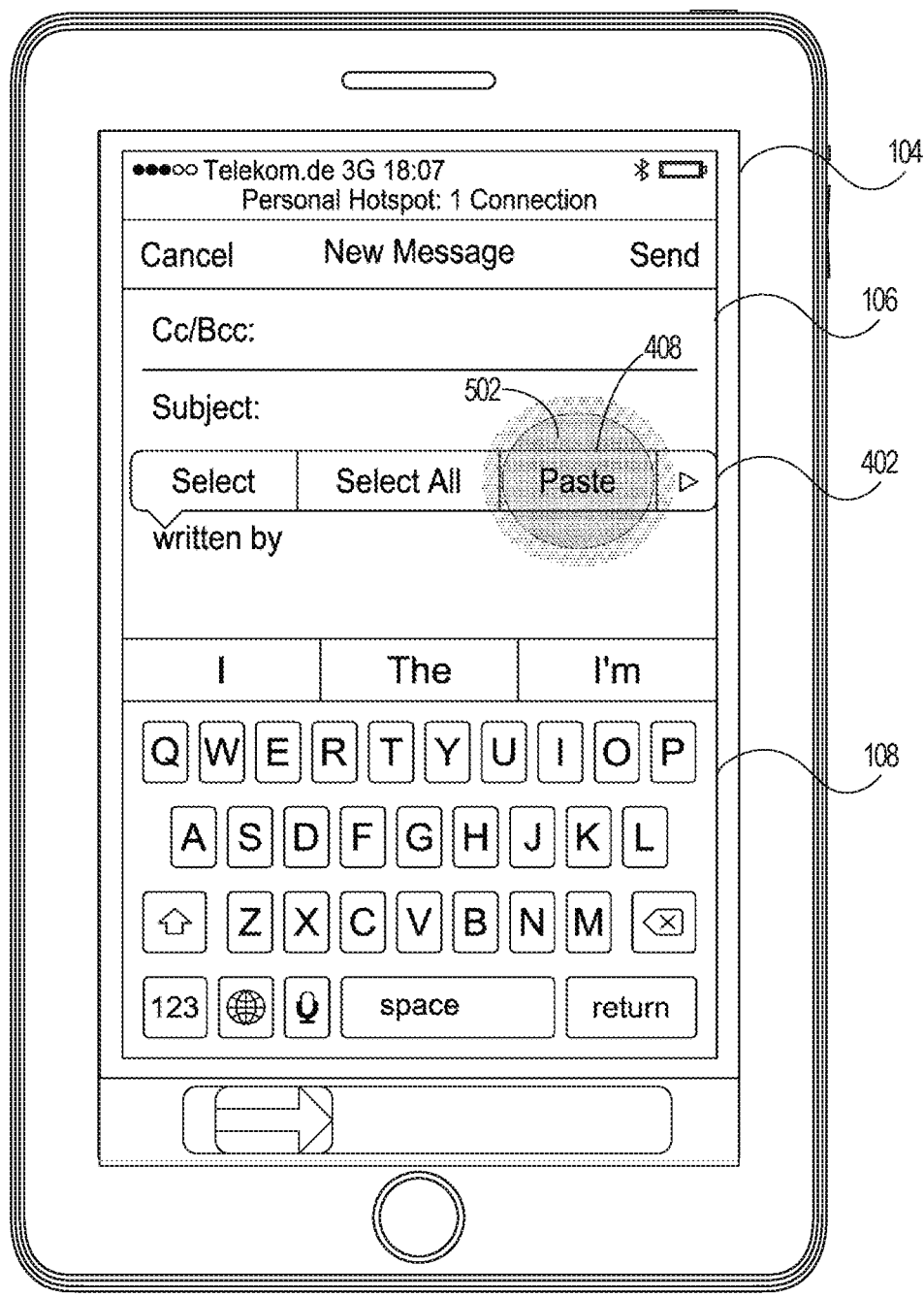

FIG. 5 illustrates an example of the user selecting the paste menu option 408 from the menu 402 displayed on the display 104. In FIG. 5, the shading 502 indicates the area touched by an input component of the user, such as a finger, stylus, pen, or other such input component. While the foregoing input components are touch-sensitive components, the user may use other means to provide the input to the display 104, such as a mouse or keyboard, whether the mouse and/or keyboard are connected via wired or wireless interface (e.g., USB and/or Bluetooth®).

Figure 6:
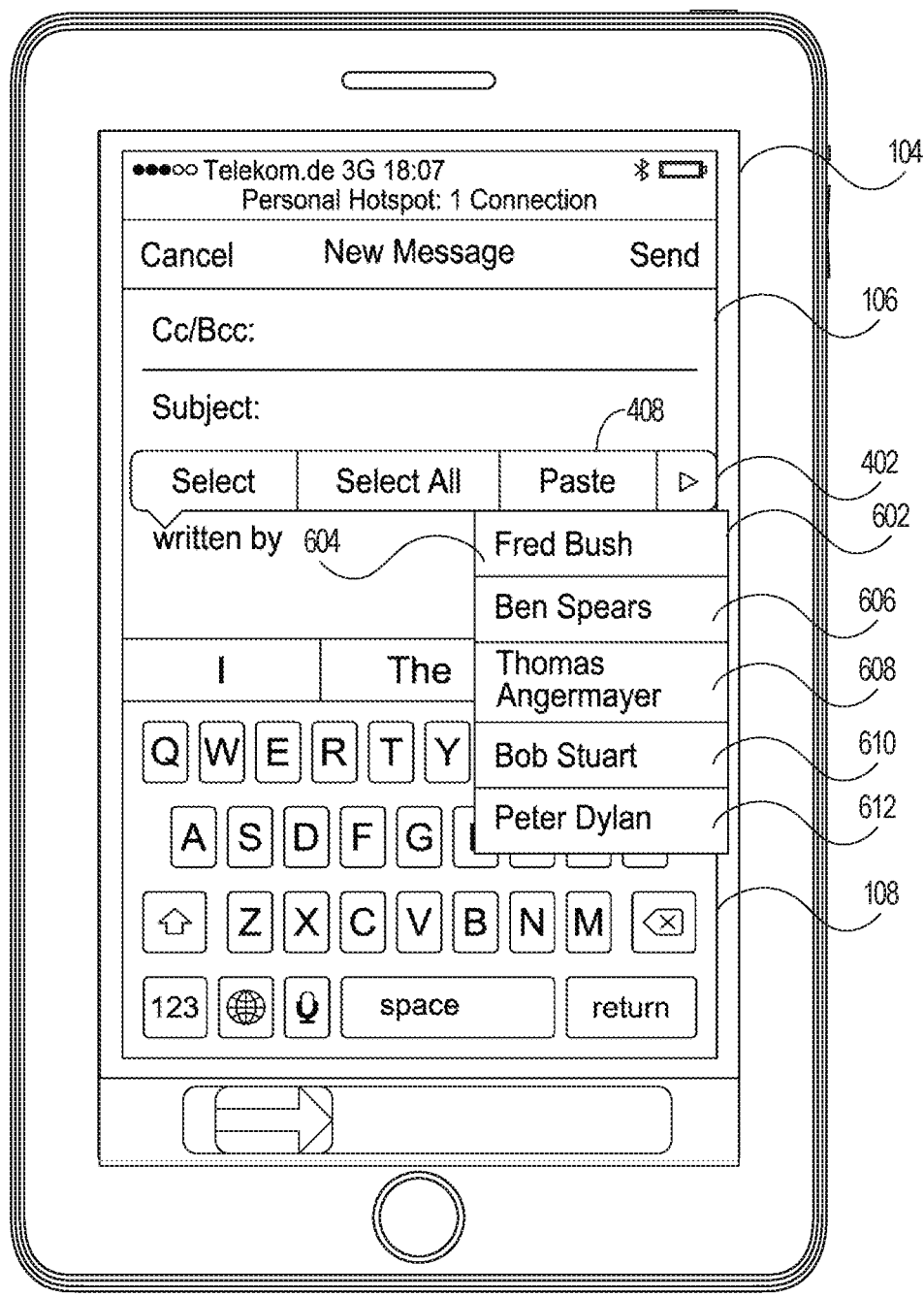

FIG. 6 illustrates an example of a history of objects that can be pasted being displayed in response to the touching by the user shown in FIG. 5. In one embodiment, and as shown in FIG. 6, the history is implemented as a submenu 602 of selectable options 604-612. In this embodiment, the custom paste module 220 references the labels for the objects that can be pasted, both for text objects and non-text objects, and displays those labels as the selectable options 604-612 of the submenu 602. Furthermore, the submenu 602 displays prior objects that have been copied by the user. In the example shown in FIG. 6, the user has previously copied at least five objects. Although the submenu 602 displays five objects, the custom paste module 220 may be configurable to display any other number of options (e.g., fewer or more options). Furthermore, the labels shown in the submenu 602 are associated with objects that are primarily text objects.

Like the display of the parent menu 402, the display of the submenu 602 is in response to a preconfigured gesture received from an input component via the display 104. In one embodiment, the preconfigured gesture is a "short tap" or "short press." In this regard, a "short tap" or "short press" may be a touching by the user of the display 104 that is less than a predetermined time period (e.g., one or two seconds). As discussed above, the physical touching by the input component is interpreted by the gesture framework 222, which communicates the type of gesture received to the operating system 214 and/or the custom paste module 220. The operating system 214 and/or the custom paste module 220 then responds accordingly to the type of received gesture. In the embodiment shown in FIG. 6, a "short tap" of the paste menu option 408 results in the display of the submenu 602.

Figure 7:
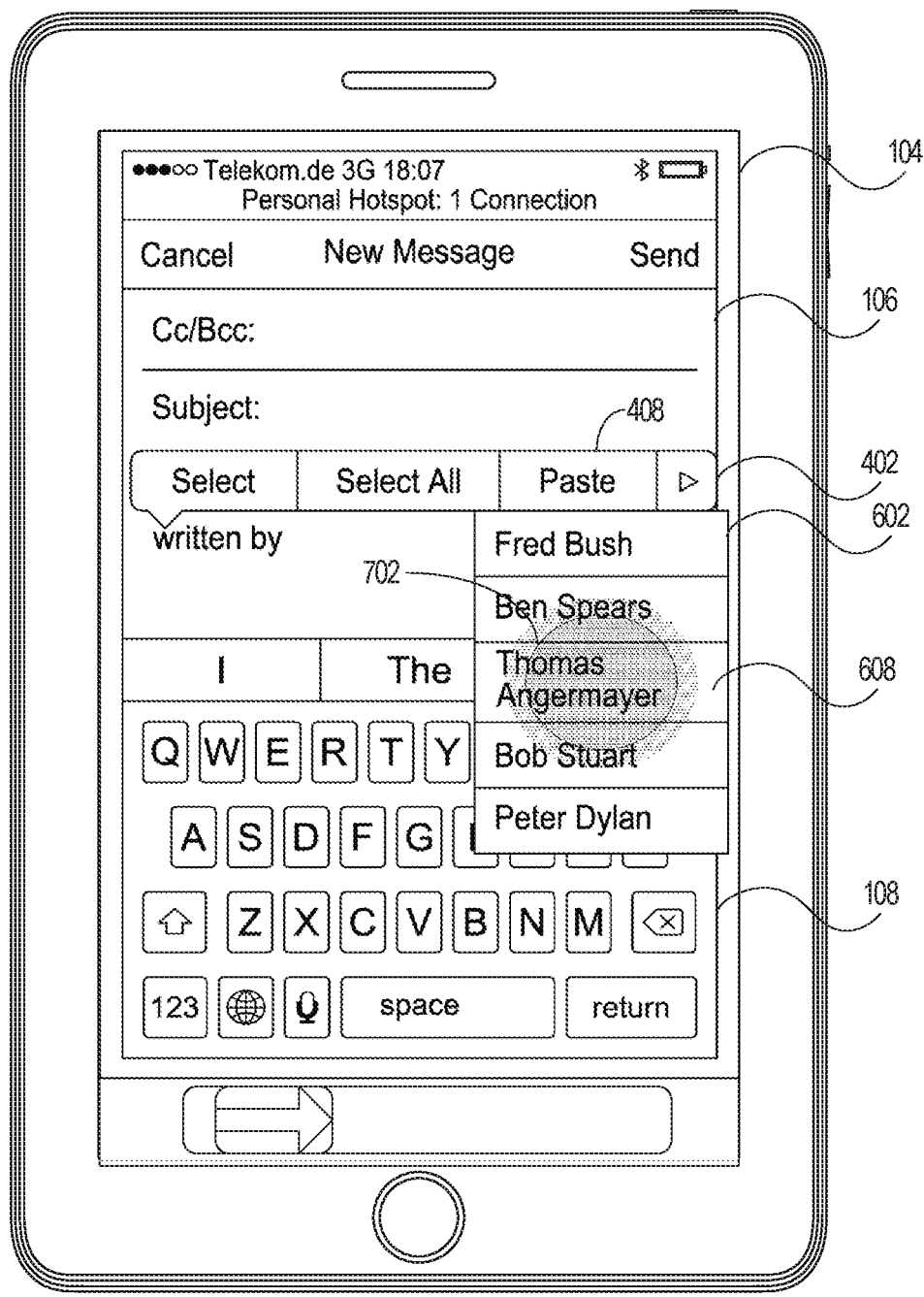
Figure 8:
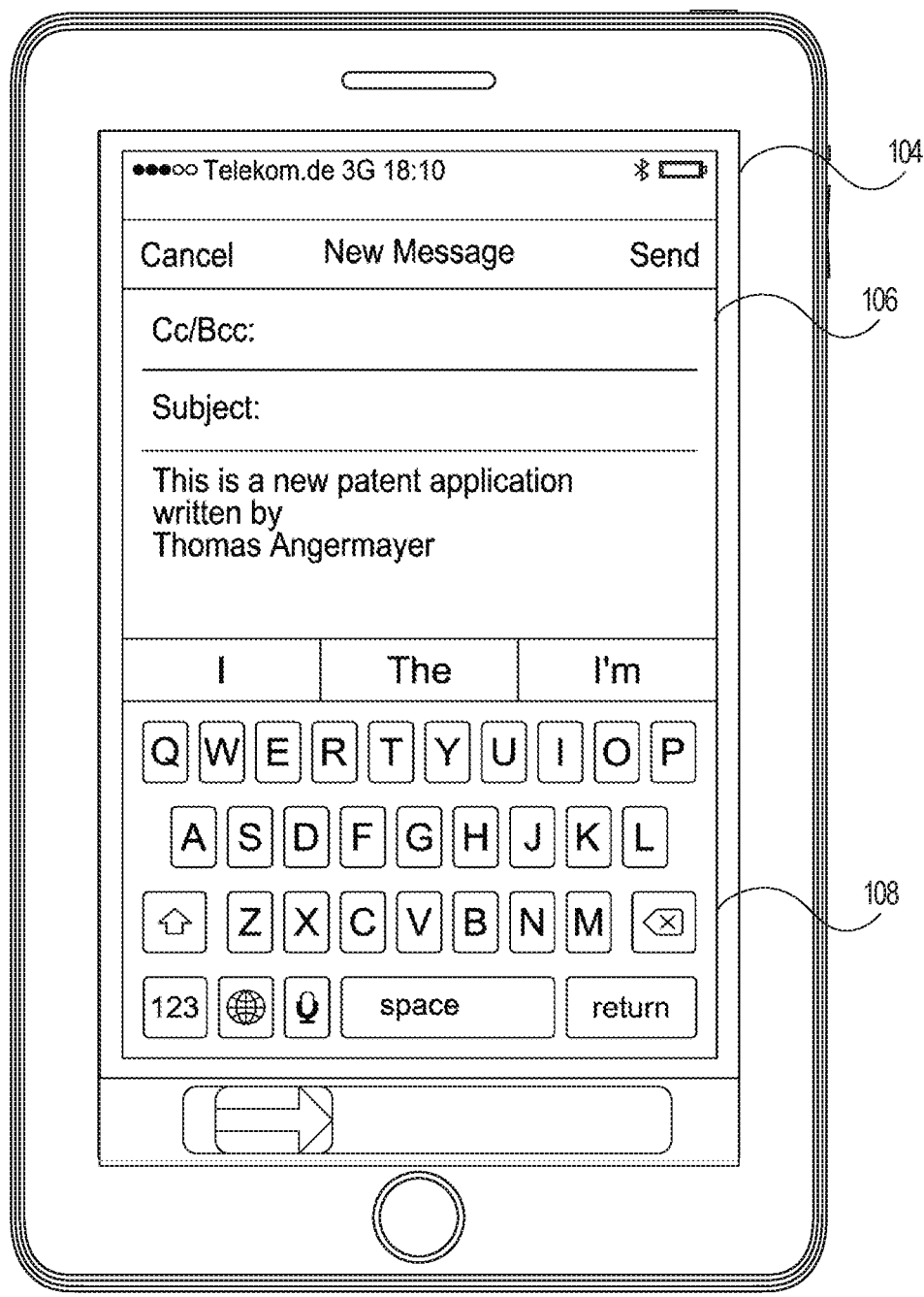

FIG. 7 illustrates an example of selecting a menu option 608 from the submenu 602. As shown in FIG. 7, the shading 702 represents the touching of the display 104 by the user. In response to the selection of the menu option 608, the custom paste module 220 retrieves the object corresponding to the selected menu option 608. As shown in FIG. 8, the custom paste module 220 then inserts the object corresponding to the selected menu option 608. In the example shown in FIG. 8, the selected object is a text object and the insertion by the custom paste module 220 results in an insertion of text, namely, the name "Thomas Angermayer."

Figure 9A:
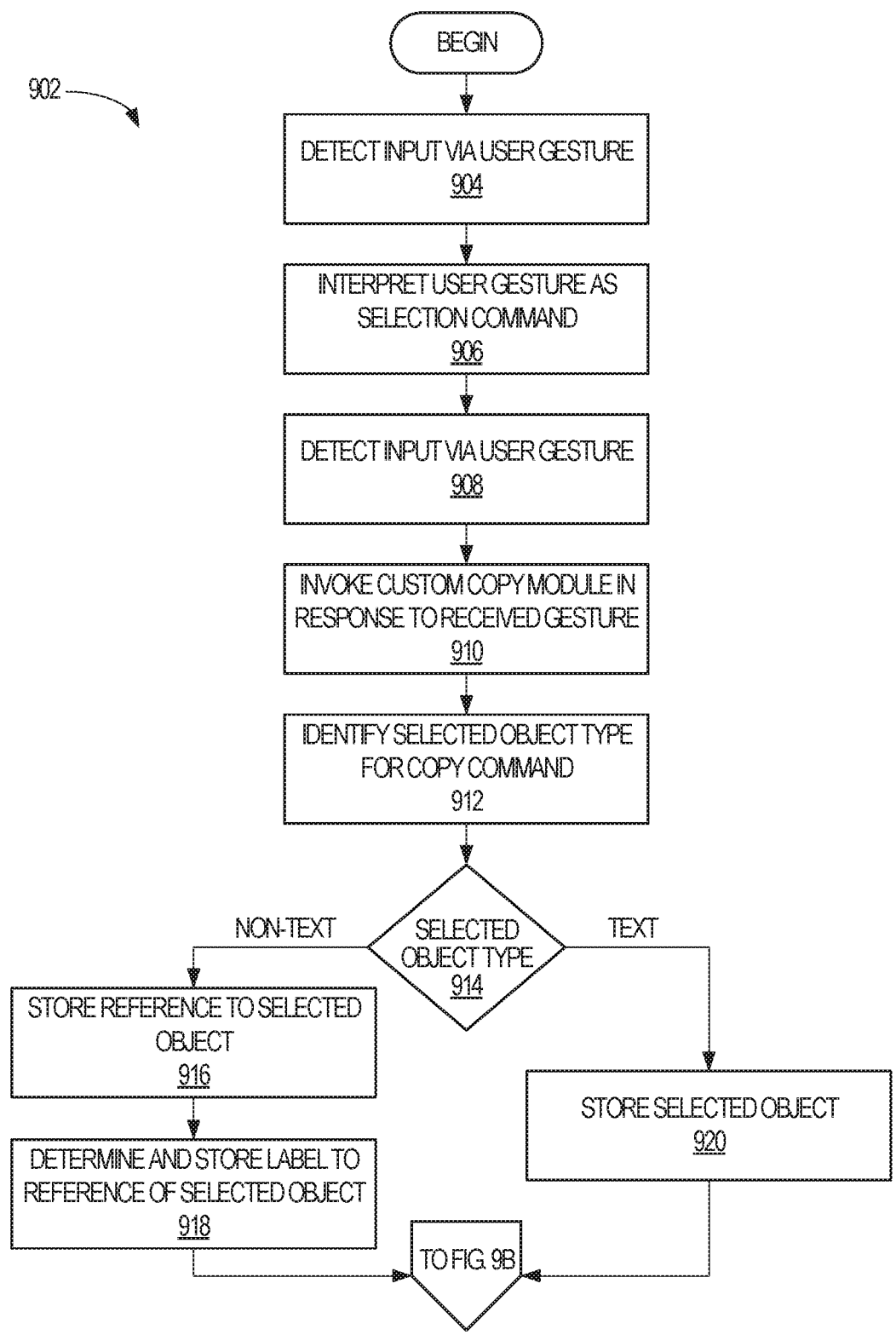
FIGS. 9A-9B illustrate a method, in accordance with an example embodiment, for copying a selected object using the mobile device diagrammed in FIG. 2.
Figure 9B:
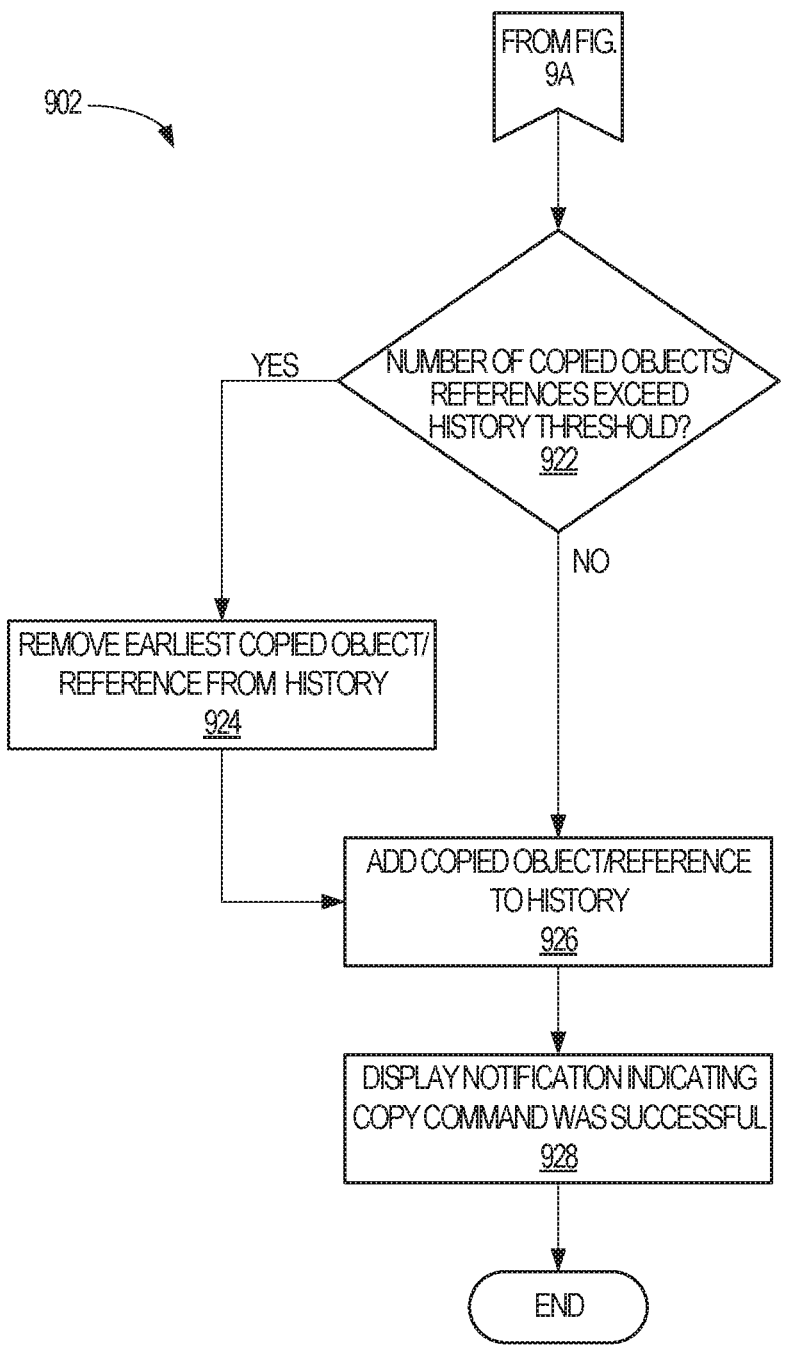

FIGS. 9A-9B illustrate a method 902, in accordance with an example embodiment, for copying a selected object using the mobile device diagrammed in FIG. 2. The method 902 may be performed by one or more components of the mobile device 102 and is discussed by way of reference thereto. Referring to FIG. 9A, the mobile device 102 initially detects an input in response to a user gesture (Operation 904). As discussed above, the user may provide an input to the mobile device 102 by touching a touch-sensitive display 104 using one or more input components such as a finger, stylus, pen, or other input component. The operating system 214, via the gesture framework 222, then converts the received touching to a gesture type. Depending on the received gesture type, the operating system 214 then interprets the received user gesture as a selection command (Operation 906). The user gesture may further indicate a selection of an object displayed on the display 104, such as a text or non-text object.

The mobile device 102 then receives another user gesture to invoke the copy command (Operation 908). This additional user gesture may be a touch by the user of a displayed graphic and/or icon indicating a copy command. As discussed above, the gesture framework 222 then further converts this received gesture to a gesture type. Accordingly, where the operating system 214 determines that the received gesture type is to invoke the copy command, the operating system 214 then invokes the custom copy module 218 (Operation 910).

The custom copy module 218 then determines an object type for a selected object (e.g., initially selected by the user from the first user gesture) (Operation 912). In one embodiment, the custom copy module 218 determines whether a selected object is a non-text object or text object (Operation 914). Where the custom copy module 218 determines that the object type is a non-text object (indicated by the branch labeled "non-text" of Operation 914), the custom copy module 218, in one embodiment, stores a reference to the selected object (Operation 916). As discussed above, the reference to the selected non-text object may be stored in a persistent datastore of the mobile device 102. In addition, the custom copy module 218 determines a label to associate with the non-text object that, as discussed below, is used by the custom paste module 220 to identify the previously copied non-text object (Operation 918). In contrast, where the custom copy module 218 determines that the selected object is a text object (indicated by the branch labeled "text" of Operation 914), the custom copy module 218 stores the text object in the designated persistent datastore (Operation 920). The label associated with the stored text object is, in one embodiment, one or more words and/or phrases of the stored text object.

As discussed above, the custom copy module 218 may be configured by the user that establishes a limit or threshold on the number of objects that are available via the copied object history (e.g., the copied object(s) 226 and the references to copied objects 228). Accordingly, and with reference to FIG. 9B, the custom copy module 218 determines whether the copying of the selected object would result in exceeding this history threshold (Operation 922). Where the history threshold would be met or exceeded (e.g., the "Yes" branch of Operation 922), the custom copy module 218 removes the earliest copied object and/or reference to the copied object from the history (Operation 924). In one embodiment, the custom copy module 218 removes the copied object and/or reference to the copied object by assigning an array element corresponding to the oldest copied object to the newly copied object, and assigning an incremented array index for the newly copied object accordingly. In this manner, the newly copied object (a reference to newly copied object) becomes the newest entry in the history of copied objects while retaining the queue order in which previously copied objects were copied. Where the history threshold is not met or exceeded (e.g., the "no" branch of Operation 922), the custom copy module 218 ads the copied object and/or reference to the copied object to the history of copied objects (Operation 926). The custom copy module 218 then instructs, in one embodiment, the user interface application 212 and/or operating system 214 to display a prompt that the copy operation of the selected object was successful (Operation 928).

Figure 10A:
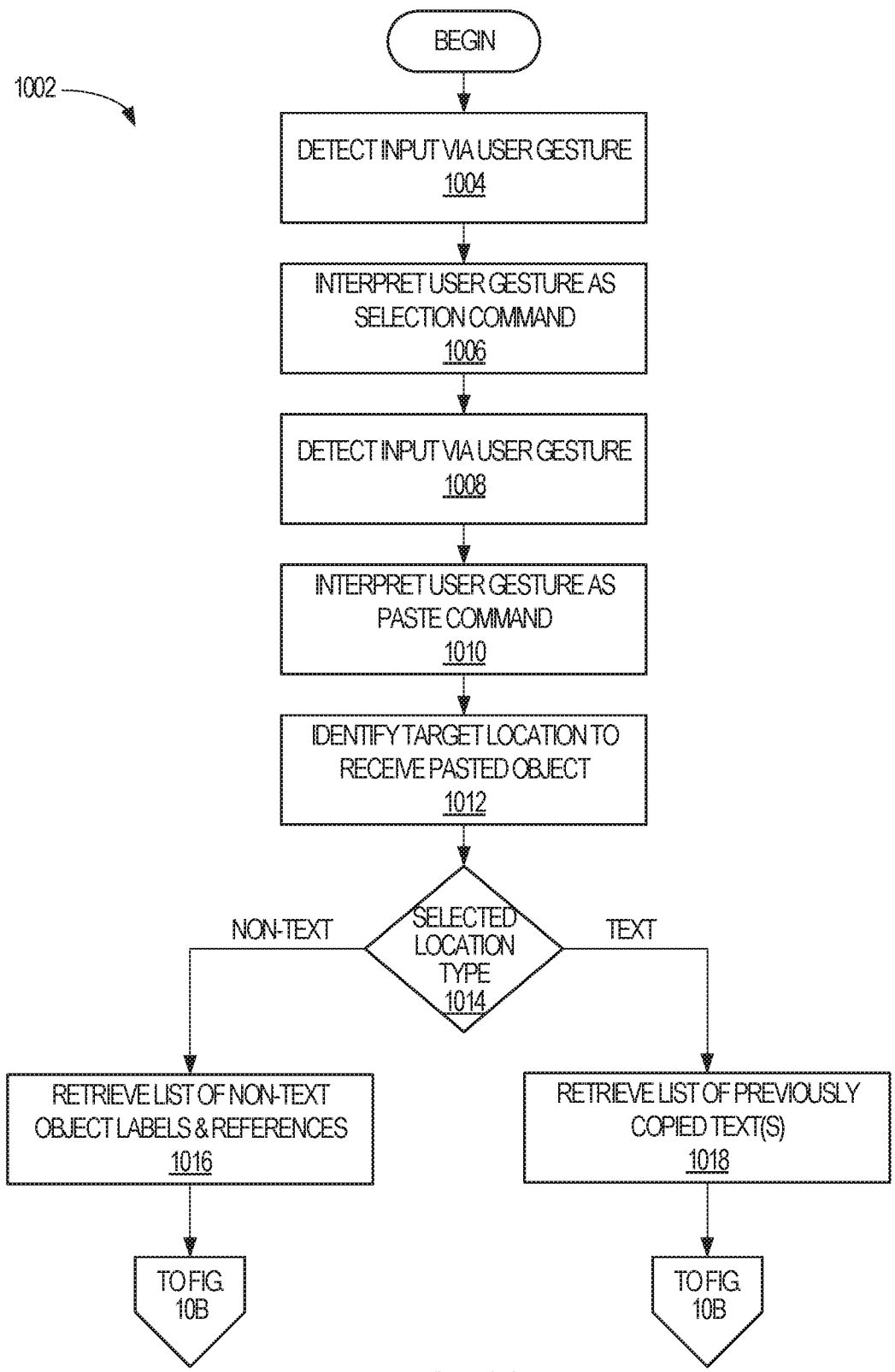
FIGS. 10A-10B illustrate a method, in accordance with an example embodiment, for pasting a copied object using the mobile device diagrammed in FIG. 2.
Figure 10B:
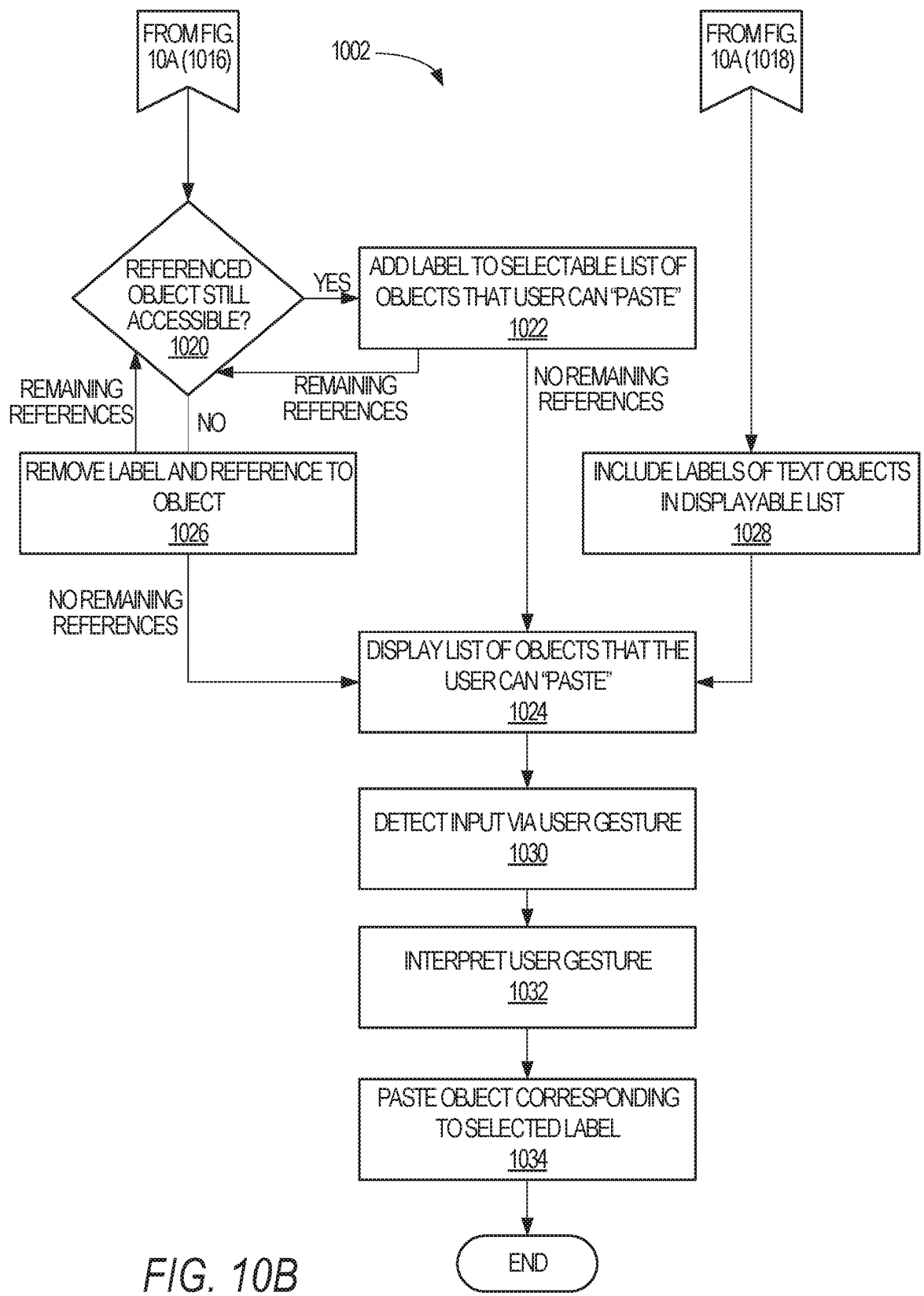

FIGS. 10A-10B illustrate a method 1002, in accordance with an example embodiment, for pasting a copied object using the mobile device 102 diagrammed in FIG. 2. The method 1002 may be implemented by one or more components of the mobile device 102 and discussed by way of reference thereto.

Referring to FIG. 10A, the mobile device 102 initially detects an input in response to a user gesture (Operation 1004). As discussed above, the user may provide an input to the mobile device 102 by touching a touch-sensitive display 104 using one or more input components such as a finger, stylus, pen, or other input component. The operating system 214, via a gesture framework 222, then converts the received touching to a gesture type. Depending on the received gesture type, the operating system 214 then interprets the received user gesture as a selection command (Operation 1006). The user gesture may further indicate a selection of a selected target area at which an object is to be inserted (e.g., "pasted"), such as a text or non-text object from the copied object history (e.g., the copied object(s) 226 and references to copied objects 228).

The mobile device 102 then receives another user gesture to invoke the paste command (Operation 1008). This additional user gesture may be a touch by the user of a displayed menu option, such as the menu option 408 shown in FIG. 4. As discussed above, the gesture framework 222 then further converts this received gesture to a gesture type. Where the operating system 214 determines that the received gesture type is to invoke the paste command, the operating system 214 then invokes the custom paste module 220 (Operation 1010).

In one embodiment, the custom paste module 220 initially determines the types of objects that can be pasted at a target location selected by the user (Operation 1012). For example, the custom paste module 220 may determine whether the selected location is suitable for non-text objects, text objects, or both types of objects. As discussed above, the custom paste module 220 may determine the types of objects suitable for the selected location by invoking the context framework 224. Where the custom paste module 220 is informed that the selected location is suitable for non-text objects (e.g., the "non-text" branch of Operation 1014), the custom paste module 220 communicates with the data 210 to retrieve a list of references to copied objects 228 and the corresponding labels that were determined for one or more of the references (Operation 1016). Where the custom paste module 220 is informed that the selected location is suitable for text objects (e.g., the "text" branch of Operation 1014), the custom paste module 220 retrieves the list of previously copied text objects (e.g., the copied objects 226) along with one or more labels that were determined for the previously copied text objects (Operation 1018).

Referring to FIG. 10B and the operations continuing from Operation 1016, the custom paste module 220 determines whether one or more of the reference copied objects are still accessible by the operating system 214 and/or the mobile device 102 (Operation 1020). Where the referenced object is still accessible (e.g., the "Yes" branch of Operation 1020), the custom paste module 220 includes the label associated with the still-accessible object to the list of selectable labels (e.g., the selectable options of the submenu 602 of FIG. 6) (Operation 1022). Where there are remaining references to check (e.g., the "remaining references" branch of Operation 1022), the method flow returns to Operation 1020. Where there are no remaining references to check (e.g., the "no remaining references" branch of Operation 1022), the method flow proceeds to Operation 1024.

Referring back to Operation 1020, where the custom paste module 220 determines that the referenced object is no longer accessible (e.g., the "No" branch of Operation 1020), the custom paste module 220 removes the previously referenced object from the copied object history (Operation 1026). In one embodiment, the custom paste module 220 determines whether the referenced object is accessible by attempting to retrieve or access the referenced object, such as by following a URL associated with the object or an operating system path to the object. In one embodiment, the custom paste module 220 removes a referenced object similarly to how the custom copy module 218 removed an object when the history threshold was met or exceeded. In this manner, the custom paste module 220 also preserves the order in which objects were copied and added to the copied object history.

After removing the reference to the object that is not accessible, the custom paste module 220 then determines whether there are remaining references to check. Where there are remaining references (e.g., the "remaining references" branch of Operation 1026), the method flow returns to Operation 1020. Where there are no remaining references to check (e.g., "no remaining references" branch of Operation 1026), the method flow proceeds to Operation 1024.

Referring back to the method flow from Operation 1018, which is after retrieving the labels for text objects, the custom paste module 220 then includes the labels associated with the text objects that the user can paste in the displayable list of selectable labels (e.g., the menu options of the submenu 602 shown in FIG. 6) (Operation 1028). The custom paste module 220 then displays the list of selectable labels for objects that the user may insert (e.g. "paste") at the location selected by the user (Operation 1024). The operating system 214 then detects a user input via a gesture on the display 104 (Operation 1030). The operating system 214, via the gesture framework 222, then interprets the received user gesture (Operation 1032). Where the received user gesture is a selection of one of the displayed labels, the custom paste module 220 then pastes the object (e.g., the non-text object or the text object) corresponding to the selected label (Operation 1034).

While the foregoing description of FIGS. 10A-10B may suggest that the displayed list only includes text or non-text objects, one of ordinary skill in the art will appreciate that the displayed list of insertable (e.g., pasteable) objects may include a combination of text and non-text objects. For example, where the context framework 224 determines that the location selected by the user is suitable for both text and non-text objects, the custom paste module 220 may follow both branches from Operation 1014 (e.g., the "non-text" branch and the "text" branch). Thus, a displayed list that includes labels associated with non-text and text objects is contemplated as falling within the scope of this disclosure.

In this manner, this disclosure provides systems and methods for maintaining a history of selected objects that have been copied by the user. Using the disclosed systems and methods, a user may maintain a running history of copied objects such that the user does not have to constantly switch applications when the user desires to "paste" an object that is not the most recently copied object. Furthermore, as this disclosure provides a manner of leveraging a contextual framework provided by a mobile operating system, the user can be presented with options for pasting contextually suitable objects on a display having a limited amount of real estate. Otherwise, valuable display space would be wasted in displaying options that are simply not contextually suitable (e.g., displaying an option for a non-text object for a text object location). Thus, this disclosure provides numerous technical benefits which include, but are not limited to, utilizing the limited amount of space of a mobile device's display, efficiently using the amount of memory available to the mobile device, and facilitating a streamlined interaction with applications on the mobile device.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-10B are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things" while yet another combination produces a server computer for use within a cloud computing architecture. Not all combinations of such software and hardware architectures are presented here as those of skill in the art can readily understand how to implement the inventive subject matter in different contexts from the disclosure contained herein.

Example Machine Architecture and Machine-Readable Medium

Figure 11:
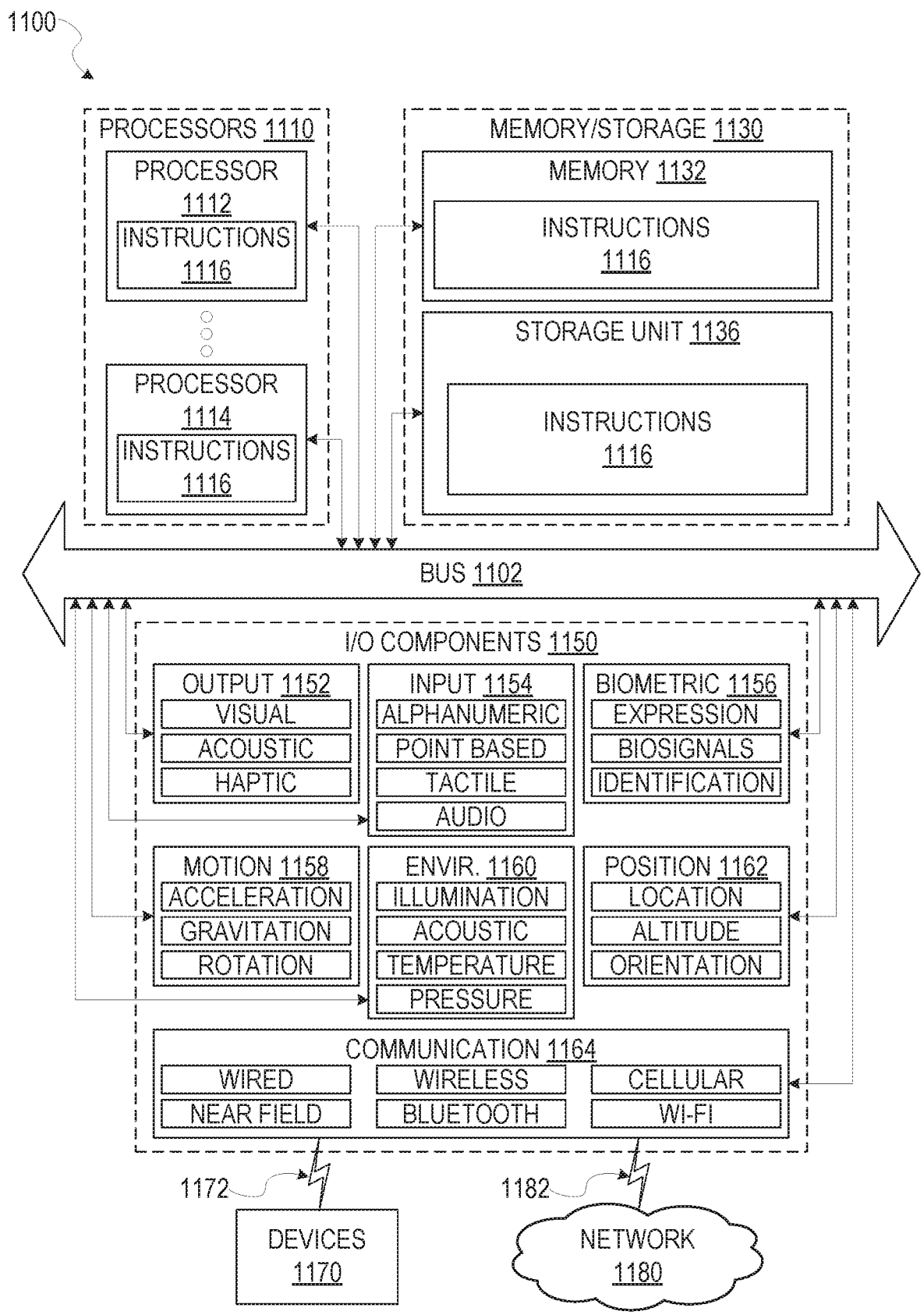
FIG. 11 is a block diagram illustrating components of a machine, according to some example embodiments, able to read instructions from a machine-readable medium (e.g., a machine-readable storage medium) and perform any one or more of the methodologies discussed herein.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example the instructions 1116 may cause the machine 1100 to execute the operations illustrated in FIGS. 9A-10B. Additionally, or alternatively, the instructions 1116 may implement one or more of the components of FIG. 2. The instructions 1116 transform the general, non-programmed machine into a particular machine programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a personal digital assistant (PDA), or any machine capable of executing the instructions 1116, sequentially or otherwise, that specify actions to be taken by machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory/storage 1130, and I/O components 1150, which may be configured to communicate with each other such as via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1112 and processor 1114 that may execute instructions 1116. The term "processor" is intended to include multi-core processor that may comprise two or more independent processors (sometimes referred to as "cores") that may execute instructions contemporaneously. Although FIG. 11 shows multiple processors 1110, the machine 1100 may include a single processor with a single core, a single processor with multiple cores (e.g., a multi-core process), multiple processors with a single core, multiple processors with multiples cores, or any combination thereof.

The memory/storage 1130 may include a memory 1132, such as a main memory, or other memory storage, and a storage unit 1136, both accessible to the processors 1110 such as via the bus 1102. The storage unit 1136 and memory 1132 store the instructions 1116 embodying any one or more of the methodologies or functions described herein. The instructions 1116 may also reside, completely or partially, within the memory 1132, within the storage unit 1136, within at least one of the processors 1110 (e.g., within the processor's cache memory), or any suitable combination thereof, during execution thereof by the machine 1100. Accordingly, the memory 1132, the storage unit 1136, and the memory of processors 1110 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162 among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometer that detects ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via coupling 1182 and coupling 1172 respectively. For example, the communication components 1164 may include a network interface component or other suitable device to interface with the network 1180. In further examples, communication components 1164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 may be another machine or any of a wide variety of peripheral devices a peripheral device coupled via a Universal Serial Bus (USB)).

Moreover, the communication components 1164 may detect identifiers or include components operable to detect identifiers. For example, the communication components 1164 may include Radio Frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1180 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network and the coupling 1182 may be a Code Division Multiple Access (CDMA) connection, a Global System for Mobile communications (GSM) connection, or other type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX) Long Term Evolution (LTE) standard, others defined by various standard setting organizations, other long range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1172 (e.g., a peer-to-peer coupling) to devices 1170. The term "transmission medium" shall be taken to include any intangible medium that is capable of storing, encoding, or carrying instructions 1116 for execution by the machine 1100, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A system comprising:
one or more hardware processors;
one or more memories storing computer-executable instructions, the computer-executable instructions configuring the one or more hardware processors to perform operations comprising:
displaying, on a display of a mobile device, a first plurality of options corresponding to a plurality of labels representing a subset of a plurality of objects previously copied into the one or more memories, the objects in the subset of the plurality of objects having types that are suitable for insertion at a designated location, a determination of whether the objects in the subset of the plurality of objects have the types that are suitable for the insertion at the designated location being based on an invoking of a context framework, the invoking of the context framework identifying whether text objects, non-text objects, or text objects and non-text objects are suitable for the designated location, the displaying including providing indications, for non-text objects, whether the non-text objects are accessible, determinations of whether the non-text objects are accessible being based on attempts to access the non-text objects using references associated with the non-text objects;
receiving, from an input component of the mobile device, a selection of an option from the first plurality of options; and
electronically inserting, at the designated location, a selected object from the subset corresponding to the received selection.

2. The system of claim 1, wherein the previously copied objects associated with the plurality of displayed options are each associated with the same object type, the object type being one of a text object type or a non-text object type.

3. The system of claim 1, wherein:
at least one previously copied object comprises a non-text object and a reference to the non-text object;
at least one displayed option was included in the first plurality of options by determining that the at least one previously copied object was accessible by the at least one hardware processor; and
electronically inserting the previously copied object comprises retrieving the non-text object using the reference to the non-text object.

4. The system of claim 1, wherein the at least one hardware processor is further configured to:
receive a selection of an object to copy, the object being displayed on the display of the mobile device;

in response to a determination that the selected object is a non-text object, create a reference to the non-text object in the machine-readable memory of the mobile device; and wherein at least one of the options of the first plurality of options is associated with the reference to the non-text object.

5. The system of claim 1, wherein the at least one hardware processor is further configured to:

receive a selection of an object to copy, the object being displayed on the display of the mobile device;

in response to a determination that copying the selected object exceeds a copied object threshold indicating a maximum number of previously copied objects, remove the earliest previously copied object from a plurality of previously copied objects; and store the selected object as the newest copied object relative to the plurality of previously copied objects, the selected object being associated with the plurality of previously copied objects.

6. The system of claim 1, wherein the first plurality of options comprise a first option corresponding to a first text object, a second option corresponding to a second text object, and a third option corresponding to a third text object, each of the first, second, and third text objects being different objects.

7. The system of claim 1, wherein the at least one hardware processor is further configured to:

receive a first gesture that causes the display of the mobile device to display a second plurality of options, the second plurality of options comprising an option to display the first plurality of options; and receive a second gesture that causes the display of the first plurality of options;

wherein the first gesture and the second gesture are different gesture types.

8. A method comprising:

displaying, on a display of a mobile device, a first plurality of options corresponding to a plurality of labels representing a subset of a plurality of objects previously copied into the one or more memories, the objects in the subset of the plurality of objects having types that are suitable for insertion at a designated location, a determination of whether the objects in the subset of the plurality of objects have the types that are suitable for the insertion at the designated location being based on an invoking of a context framework, the invoking of the context framework identifying whether text objects, non-text objects, or text objects and non-text objects are suitable for the designated location, the displaying including providing indications, for non-text objects, whether the non-text objects are accessible, determinations of whether the non-text objects are accessible being based on attempts to access the non-text objects using references associated with the non-text objects; and electronically inserting at the designated location, by at least one hardware processor of the mobile device, a selected object from the subset corresponding to a received selection of an option from the first plurality of the options.

9. The method of claim 8, wherein the previously copied objects associated with the plurality of displayed options are each associated with the same object type, the object type being one of a text object type or a non-text object type.

10. The method of claim 8, wherein at least one displayed option selected from the first plurality of options comprises a label associated with the previously copied object corresponding to the at least one displayed option.

11. The method of claim 8, wherein:

at least one previously copied object comprises a non-text object and a reference to the non-text object;

at least one displayed option was included in the first plurality of options by determining that the at least one previously copied object was accessible by the at least one hardware processor; and electronically inserting the previously copied object comprises retrieving the non-text object using the reference to the non-text object.

12. The method of claim 8, further comprising:

receiving a selection of an object to copy, the object being displayed on the display of the mobile device;

in response to a determination that the selected object is a non-text object, creating a reference to the non-text object in a machine-readable memory of the mobile device; and wherein at least one of the options of the first plurality of options is associated with the reference to the non-text object.

13. The method of claim 8, further comprising:

receiving a selection of an object to copy, the object being displayed on the display of the mobile device;

in response to a determination that copying the selected object exceeds a copied object threshold indicating a maximum number of previously copied objects, removing the earliest previously copied object from a plurality of previously copied objects; and storing the selected object as the newest copied object relative to the plurality of previously copied objects, the selected object being associated with the plurality of previously copied objects.

14. The method of claim 8, wherein the first plurality of options comprise a first option corresponding to a first text object, a second option corresponding to a second text object, and a third option corresponding to a third text object, each of the first, second, and third text objects being different objects.

15. The method of claim 8, further comprising:

receiving a first gesture that causes the display of the mobile device to display a second plurality of options, the second plurality of options comprising an option to display the first plurality of options; and receiving a second gesture that causes the display of the first plurality of options;

wherein the first gesture and the second gesture are different gesture types.

16. A non-transitory machine-readable medium storing computer-executable instructions that, when executed by at least one hardware processor, cause the at least one hardware processor to perform operations, the operations comprising:

displaying, on a display of a mobile device, a first plurality of options corresponding to a plurality of labels representing a subset of a plurality of objects previously copied into the one or more memories, the objects in the subset of the plurality of objects having types that are suitable for insertion at a designated location, a determination of whether the objects in the subset of the plurality of objects have the types that are suitable for the insertion at the designated location being based on an invoking of a context framework, the invoking of the context framework identifying whether text objects, non-text objects, or text objects and non-text objects are suitable for the designated location, the displaying including providing indications, for non-text objects whether the non-text objects are accessible, determinations of whether the non-text objects are accessible being based on attempts to access the non-text objects using references associated with the non-text objects; and electronically inserting at the designated location a selected object from the subset corresponding to a received selection of an option from the first plurality of the options.

17. The non-transitory machine-readable medium of claim 16, wherein the previously copied objects associated with the plurality of displayed options are each associated with the same object type, the object type being one of a text object type or a non-text object type.

18. The non-transitory machine-readable medium of claim 16, wherein:
at least one previously copied object comprises a non-text object and a reference to the non-text object;
at least one displayed option was included in the first plurality of options by determining that the at least one previously copied object was accessible by the at least one hardware processor; and
electronically inserting the previously copied object comprises retrieving the non-text object using the reference to the non-text object.

19. The non-transitory machine-readable medium of claim 16, wherein the first plurality of options comprise a first option corresponding to a first text object, a second option corresponding to a second text object, and a third option corresponding to a third text object, each of the first, second, and third text objects being different objects.

20. The non-transitory machine-readable medium of claim 16, wherein the plurality of operations further comprises:
receiving a first gesture that causes the display of the mobile device to display a second plurality of options, the second plurality of options comprising an option to display the first plurality of options; and
receiving a second gesture that causes the display of the first plurality of options; wherein
the first gesture and the second gesture are different gesture types.

* * * * *